(12) United States Patent
Kincaid et al.

(10) Patent No.: US 7,866,231 B2
(45) Date of Patent: Jan. 11, 2011

(54) AXLE ASSEMBLY HAVING GASKET THAT SHIELDS AN OPENING

(75) Inventors: Jeffrey L Kincaid, Clarkston, MI (US); Rodney J Campbell, Grand Blanc, MI (US); Holly C Richards, Macomb, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 312 days.

(21) Appl. No.: 12/194,083

(22) Filed: Aug. 19, 2008

(65) Prior Publication Data

US 2010/0043581 A1 Feb. 25, 2010

(51) Int. Cl.
F16H 57/02 (2006.01)
(52) U.S. Cl. ...................................... 74/607
(58) Field of Classification Search ............... 74/606 R, 74/607, 606 A; 277/628, 630, 637
See application file for complete search history.

(56) References Cited

U.S. PATENT DOCUMENTS

| | | | |
|---|---|---|---|
| 1,595,020 A * | 8/1926 | Nadler ................. | 74/606 A |
| 2,701,972 A | 2/1955 | Hoffman | |
| 3,314,306 A | 4/1967 | Barclae | |
| 3,529,698 A * | 9/1970 | Nelson .................. | 184/6.12 |
| 4,151,761 A * | 5/1979 | Nishikawa et al. ........ | 74/606 A |
| 4,351,203 A | 9/1982 | Fukunaga | |
| 4,554,844 A | 11/1985 | Hamano | |
| 4,625,581 A | 12/1986 | Hull | |
| 4,970,913 A | 11/1990 | Kielar et al. | |
| 5,038,631 A | 8/1991 | Renk et al. | |
| 5,220,854 A | 6/1993 | Allart et al. | |
| 5,316,106 A | 5/1994 | Baedke et al. | |
| 5,562,561 A | 10/1996 | Gillard | |
| 5,724,864 A | 3/1998 | Rodgers et al. | |
| 5,813,493 A | 9/1998 | Sloan et al. | |
| 6,158,303 A | 12/2000 | Shiraishi et al. | |
| 6,523,435 B2 | 2/2003 | Ruehle et al. | |
| 6,553,865 B1 | 4/2003 | Endreszl | |
| 6,729,207 B2 | 5/2004 | Allmandinger et al. | |
| 6,813,972 B2 | 11/2004 | Guo | |
| 7,004,277 B2 | 2/2006 | Pollock et al. | |
| 7,025,175 B1 | 4/2006 | Pate | |
| 7,231,847 B2 | 6/2007 | Hibbler et al. | |
| 7,241,246 B2 * | 7/2007 | Beutler ................... | 475/230 |
| 7,611,435 B2 * | 11/2009 | Beutler ................... | 475/160 |
| 2004/0216556 A1 | 11/2004 | Smith et al. | |
| 2006/0017234 A1 * | 1/2006 | Kuo et al. ................. | 277/630 |
| 2006/0055123 A1 * | 3/2006 | Angot et al. ............. | 277/628 |
| 2006/0089226 A1 | 4/2006 | Garcia et al. | |

(Continued)

*Primary Examiner*—Vicky A Johnson
(74) *Attorney, Agent, or Firm*—Harness, Dickey & Pierce, P.L.C.

(57) ABSTRACT

An axle assembly comprises an axle housing, a differential assembly, a cover, and a gasket. The axle housing defines a cavity and an access aperture. The differential assembly is received in the cavity and is supported for rotation in the axle housing. The cover has a flange and a body. The flange is coupled to the axle housing such that the cover closes the access aperture. The body has an opening that is in fluid connection with the cavity. The gasket has a gasket member and a tab. The gasket member is disposed between the axle housing and the flange. The tab extends inwardly from the gasket member and covers at least a portion of the opening. The tab is configured to shield the opening from splash lubrication during operation of the axle assembly.

9 Claims, 5 Drawing Sheets

U.S. PATENT DOCUMENTS

2006/0117906 A1  6/2006  Petruska et al.
2007/0056400 A1  3/2007  Kennedy
2007/0191168 A1  8/2007  Corless et al.
2008/0051245 A1  2/2008  Nakajima et al.

* cited by examiner

AXLE ASSEMBLY HAVING GASKET THAT SHIELDS AN OPENING

FIELD

The present disclosure relates generally to vehicle drive trains and more particularly to an axle assembly wherein a gasket is disposed between an axle housing and a cover.

BACKGROUND

The statements in this section merely provide background information related to the present disclosure and may not constitute prior art.

An axle assembly is typically partially filled with a lubricating fluid for lubricating and cooling various gears, pinions and bearings during the operation of a vehicle. Under normal operating conditions, the temperature of the fluids in the axle assembly (i.e., the lubricating fluid and air) increases, causing the fluids to expand. A vent can be employed to permit air to exit and enter the axle assembly when the fluids contained therein expand and contract.

Providing adequate lubrication to the components of the axle assembly is important to the operation and longevity of the axle assembly. Many automotive axle assemblies utilize splash lubrication to lubricate the various gears and pinions wherein a rotating component, such as a ring gear, rotates through the lubricating fluid. The lubricating fluid clings to the rotating component as it passes through the lubricating fluid and is thereafter slung outwardly from the rotating component due to centrifugal force.

During operation of the axle assembly, the lubricating fluid may be splashed into the vent and as a result, some of the lubricating fluid may escape through the vent.

SUMMARY

In one form, the present invention provides an axle assembly comprising an axle housing, a differential assembly, a cover, and a gasket. The axle housing defines a cavity and an access aperture. The differential assembly is received in the cavity and is supported for rotation in the axle housing. The cover has a flange and a body. The flange is coupled to the axle housing such that the cover closes the access aperture. The body has an opening that is in fluid connection with the cavity. The gasket has a gasket member and a tab. The gasket member is disposed between the axle housing and the flange. The tab extends inwardly from the gasket member and covers at least a portion of the opening. The tab is adapted to shield the opening from splash lubrication during operation of the axle assembly.

In another form, the present invention provides an axle assembly comprising an axle housing, a differential assembly, a cover, and a means. The axle housing defines a cavity and an access aperture. The differential assembly is received in the cavity and is supported for rotation in the axle housing. The cover has a flange and a body. The flange is coupled to the axle housing such that the cover closes the access aperture. The body has an opening that is in fluid connection with the cavity. The means is for sealing the axle assembly and for shielding the opening from splash lubrication during operation of the axle assembly.

In yet another form, the present invention provides an axle assembly comprising an axle housing, a differential assembly, a cover, and a gasket. The axle housing defines a cavity and an access aperture. The differential assembly is received in the cavity and is supported for rotation in the axle housing. The cover has a flange and a body. The flange is coupled to the axle housing such that the cover closes the access aperture. The body has an opening that is in fluid connection with the cavity. A projection is formed on the body and the opening is defined by an inward side of the projection. The gasket has a gasket member and a tab. The gasket member is disposed between the axle housing and the flange. The tab extends inwardly from the gasket member and covers majority of the opening. The tab is adapted to shield the opening from splash lubrication during operation of the axle assembly. The gasket has a composite construction including an aluminum sheet metal and two resilient sealing members coupled to the aluminum sheet metal. Both resilient sealing members comprise a plurality of sealing beads. The aluminum sheet metal extends throughout the gasket member and the tab and is disposed between two resilient sealing members. Both resilient sealing members extend through only the gasket member. The resilient sealing member disposed between the gasket member and the flange extends further between the tab and the body.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
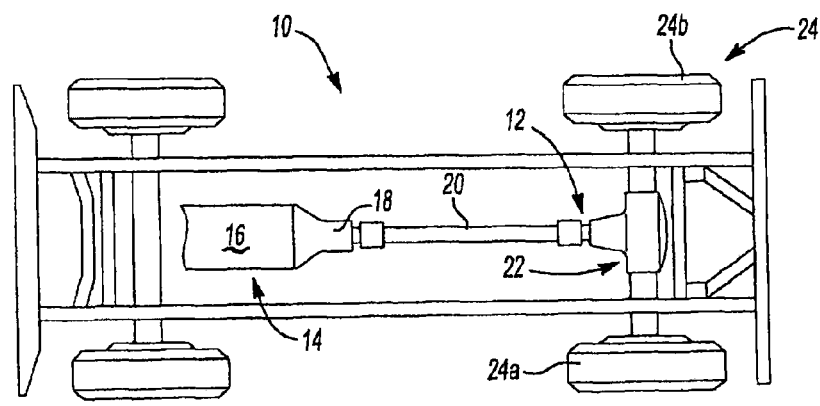
FIG. 1 is a schematic illustration of a vehicle having an axle assembly constructed in accordance with the teachings of the present disclosure.

The following description is merely exemplary in nature and is not intended to limit the present disclosure, application, or uses. It should be understood that throughout the drawings, corresponding reference numerals indicate like or corresponding parts and features.

With reference to FIG. 1 of the drawings, a vehicle having a differential assembly that is constructed in accordance with the teachings of the present disclosure is generally indicated by reference numeral 10. The vehicle 10 can include a driveline 12 that is drivable via a connection to a power train 14. The power train 14 can include an engine 16 and a transmission 18. The driveline 12 can include a propshaft 20, a rear axle assembly 22 and a plurality of wheels 24. The engine 16 can be mounted in an in-line or longitudinal orientation along the axis of the vehicle 10 and its output can be selectively coupled via a conventional clutch to the input of the transmission 18 to transmit rotary power (i.e., drive torque) therebetween. The input of the transmission 18 can be commonly aligned with the output of the engine 16 for rotation about a rotary axis. The transmission 18 can also include an output and a gear reduction unit. The gear reduction unit can be operable for coupling the transmission input to the transmission output at a predetermined gear speed ratio. The propshaft 20 can be coupled for rotation with the output of the transmission 18. Drive torque can be transmitted through the propshaft 20 to the rear axle assembly 22 where it can be selectively apportioned in a predetermined manner to the left and right rear wheels 24a and 24b, respectively.

Figure 2:
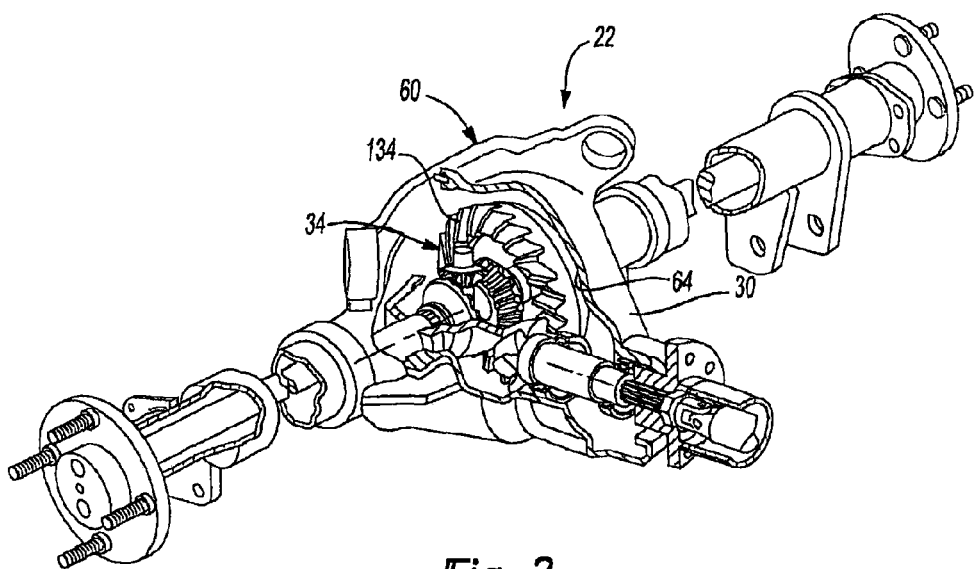
FIG. 2 is a partially broken-away perspective view of a portion of the vehicle of FIG. 1 illustrating the axle assembly in more detail.
Figure 3:
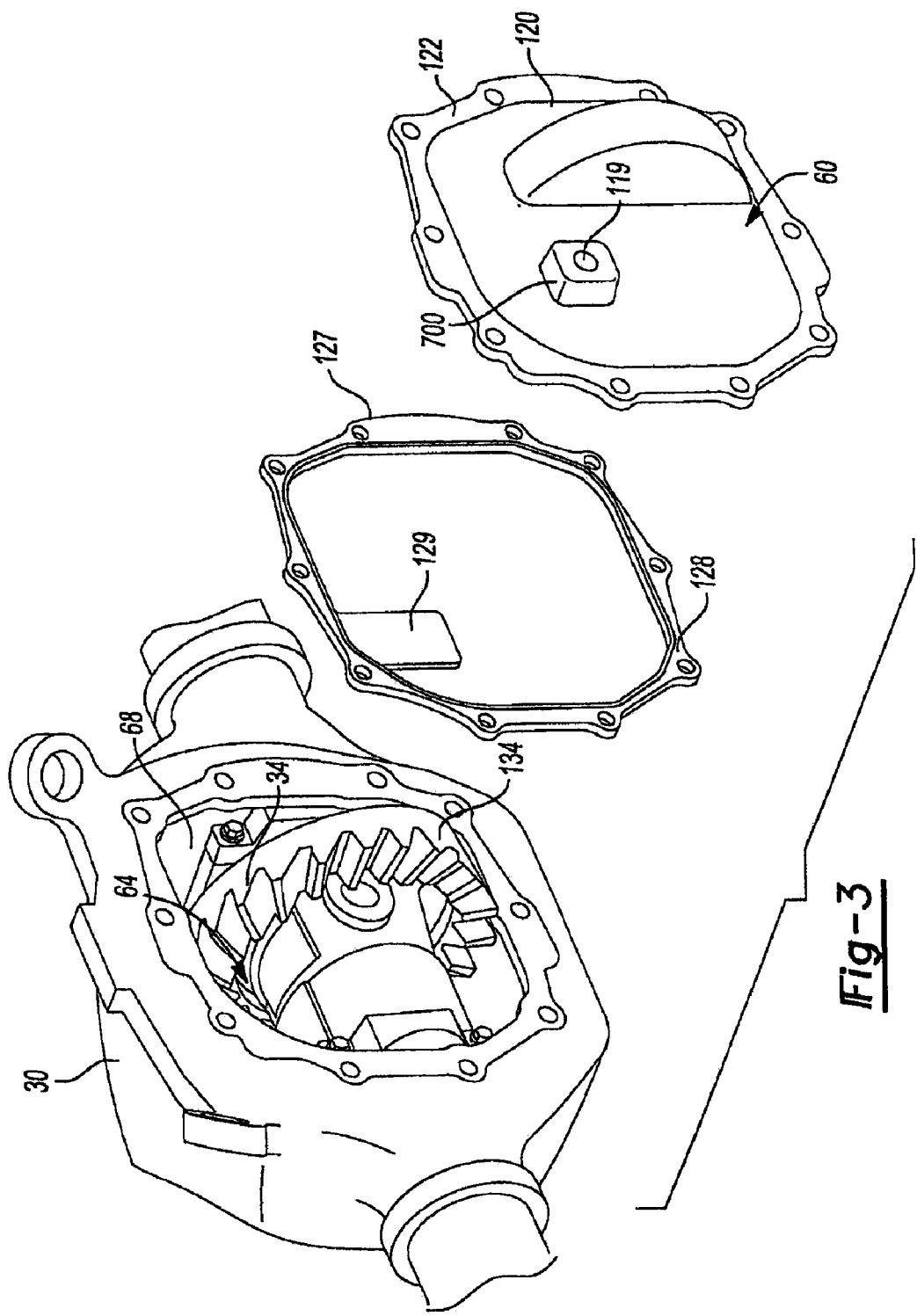
FIG. 3 is an exploded perspective view of a portion of the rear of the axle assembly shown in FIG. 1.

With reference to FIGS. 2 and 3, the rear axle assembly 22 can include an axle housing 30, a differential assembly 34, a cover 60, and a gasket 127. The axle housing 30 can define an internal cavity 64 and an access aperture 68. The differential assembly 34 can be received in the cavity 64 and be supported for rotation in the axle housing 30. The differential assembly 34 can include a ring gear 134. The cover 60 can have a vent 119.

Figure 4:
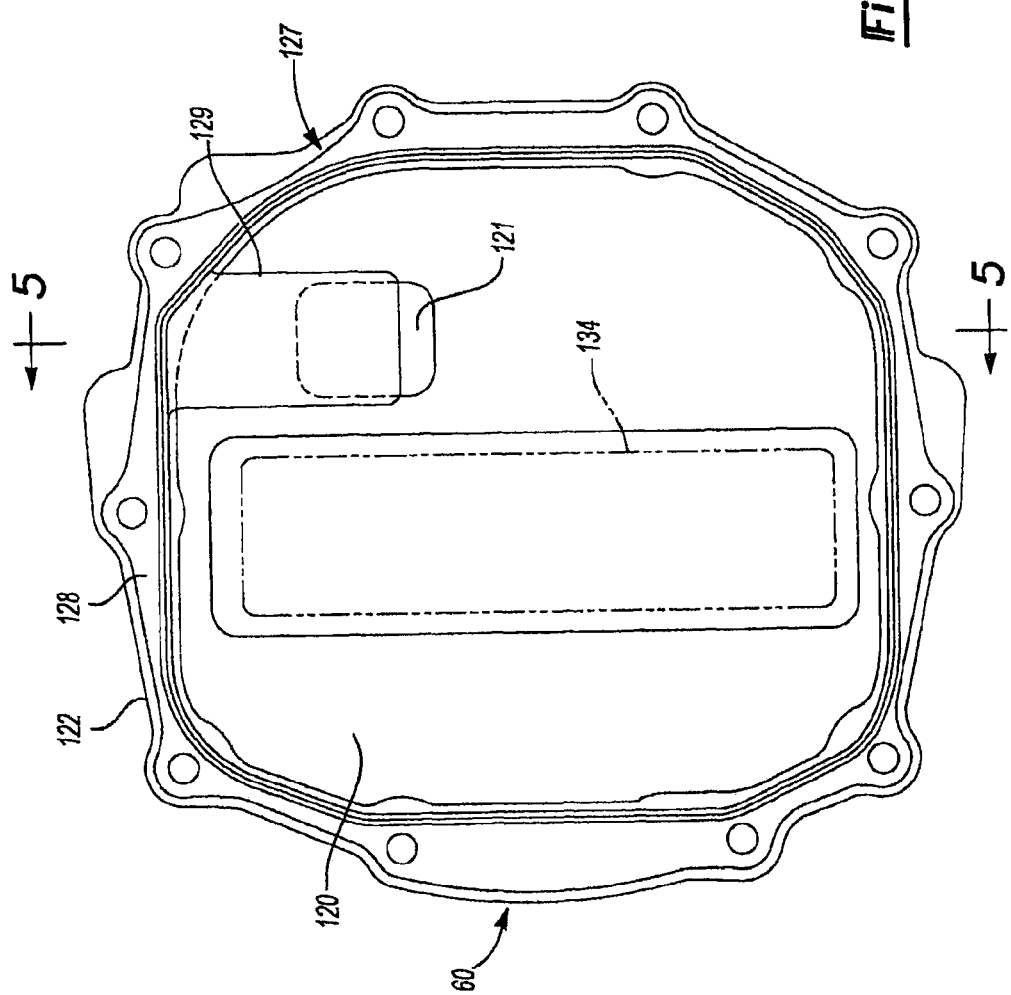
FIG. 4 is a front elevation view of a portion of the axle assembly shown in FIG. 1 illustrating the cover and the gasket in more detail.
Figure 5:
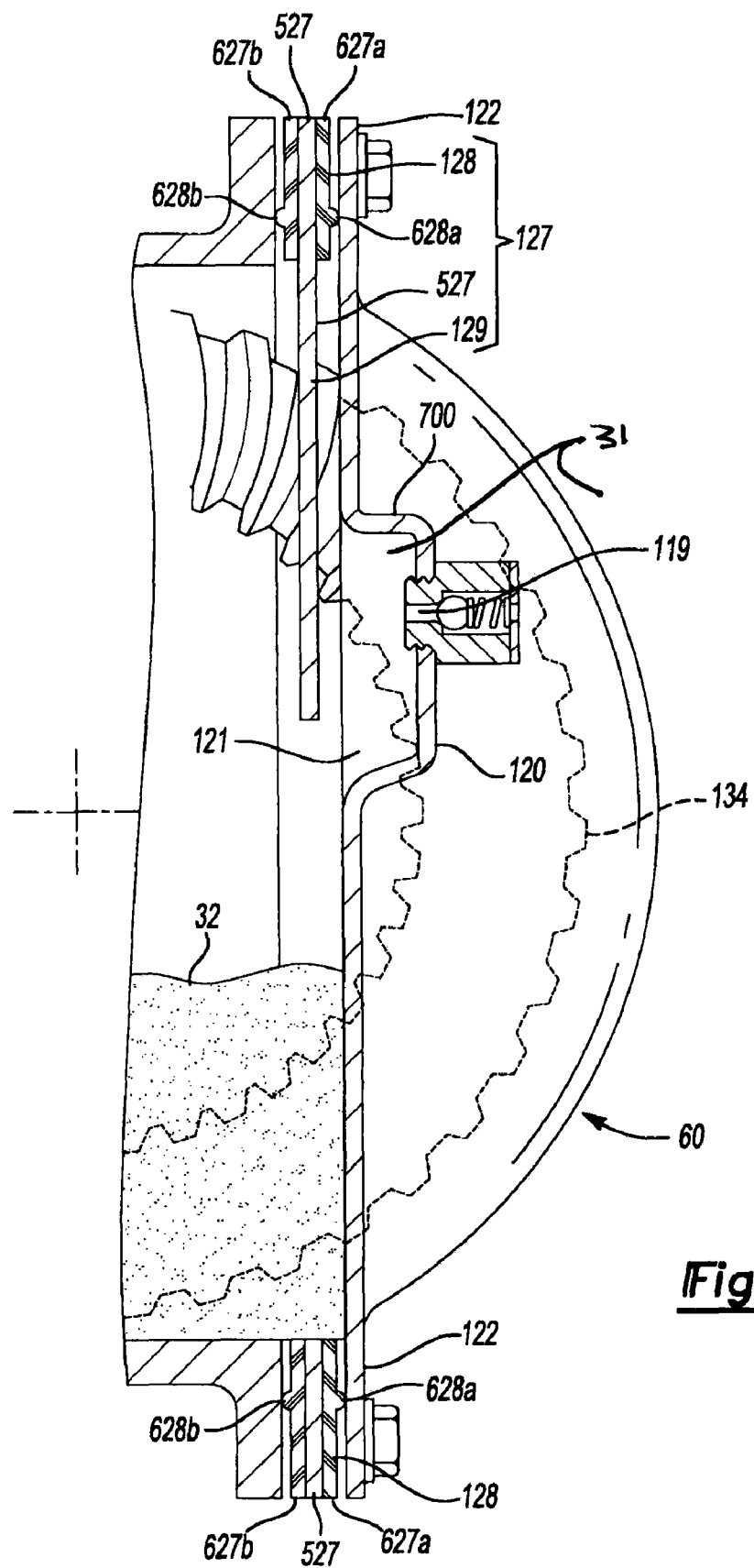
FIG. 5 is a cross-section view taken along the line 5-5 of FIG. 4.

With reference to FIGS. 3 through 5, the cover 60 can include a body 120 and a flange 122 that can be coupled to the axle housing 30 such that the cover 60 closes the access aperture 68. The body 120 can have an opening 121 that is in fluid connection with the cavity 64. The vent 119 is also in fluid connection with the cavity 64 through the opening 121, thereby permitting air 31 to exit and enter the axle assembly 22 when the fluids (e.g. a lubricating fluid 32 and air 31) contained therein expand and contract. The gasket 127 can include a gasket member 128 and a tab 129. The gasket member 128 can be disposed between the axle housing 30 and the flange 122. The tab 129 can extend inwardly from the gasket member 128. The tab 129 can cover at least a portion of (e.g. a majority of) the opening 121. The tab 129 can be adapted to shield the opening 121 from splash lubrication during operation of the axle assembly 22. Therefore, the gasket 127 provides a means for sealing the axle assembly 22 and for shielding the opening 121 from splash lubrication when the ring gear 134 rotates through the lubricating fluid 32 during operation of the axle assembly 22.

With specific reference to FIG. 5, a projection 700 can be formed on the body 120. The opening 121 can be defined by an inward side of the projection 700. The gasket 127 can have a composite construction and can include a backing member 527 and two resilient sealing members 627a and 627b coupled to the opposite sides of the backing member 527. The backing member 527 can extend throughout the gasket member 128 and the tab 129. The backing member 527 can be formed of an appropriate material, such as a sheet metal (e.g. aluminum), and can be disposed between the resilient sealing members 627a and 627b. The resilient sealing members 627a and 627b can be formed of an appropriate material, such as an elastomer or thermoplastic elastomer and can be sized and shaped in a desired manner. In the example provided, each of the resilient sealing members 627a and 627b extends only over the portion of the gasket 127 that includes the gasket member 128. The resilient sealing member 627a includes a sealing bead 628a. The resilient sealing member 627b includes a sealing bead 628b.

Figure 6:
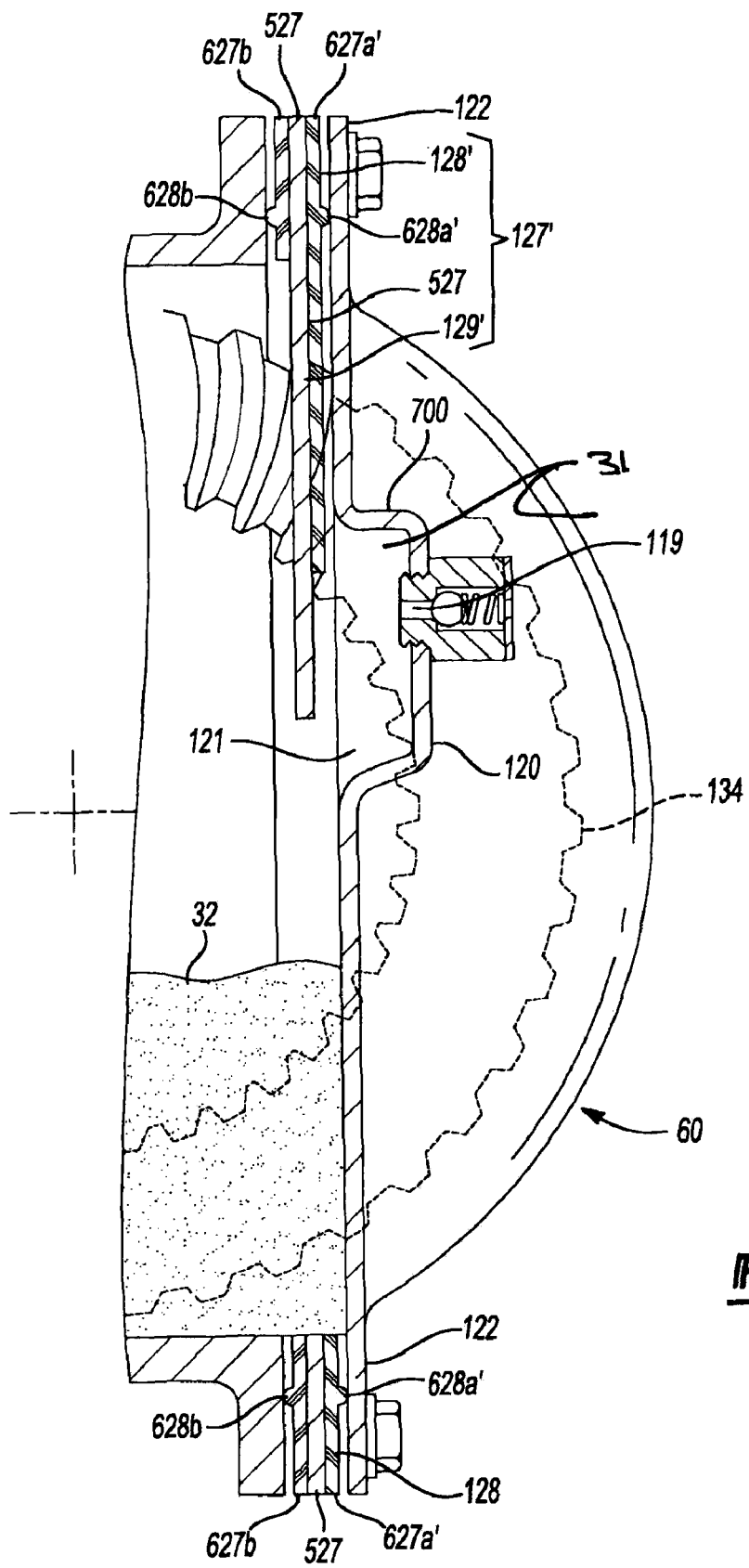
FIG. 6 is a cross-section similar to that of FIG. 5 but illustrating an alternately constructed gasket.

With reference to FIG. 6, an alternately constructed gasket is generally indicated by reference numeral 127'. Except as described herein, the gasket 127' can be similar to the gasket 127 described above and illustrated in FIGS. 3 through 5. In this regard, the gasket 127' can include a gasket member 128', a tab 129', and a resilient sealing member 627a' that can be disposed between the backing member 527 and the cover 60. The resilient sealing member 627a' can include a sealing bead 628a' and can extend over a side of the gasket member 128' and inwardly over a desired portion of the tab 129'. Configuration in this manner may dampen vibrations transmitted to/from the tab 129' and/or further isolate or shield the opening 121 to guard against the lubricating fluid 32 entering the vent 119.

What is claimed is:

1. An axle assembly comprising:
   an axle housing defining a cavity and an access aperture;
   a differential assembly received in the cavity, the differential assembly supported for rotation in the axle housing;
   a cover with a flange and a body, the flange coupled to the axle housing such that the cover closes the access aperture, the body having an opening that is in fluid connection with the cavity;
   a gasket having a gasket member and a tab, the gasket member being disposed between the axle housing and the flange, the tab extending inwardly from the gasket member and covering at least a portion of the opening; and
   a vent valve mounted to the body and in fluid communication with the opening;
   wherein the tab is adapted to shield the opening and the vent valve from splash lubrication during operation of the axle assembly.

2. The axle assembly of claim 1, wherein the tab covers a majority of the opening.

3. The axle assembly of claim 1, wherein the gasket has a composite construction including a backing member and a resilient sealing member coupled to the backing member.

4. The axle assembly of claim 3, wherein the backing member is formed of sheet metal.

5. The axle assembly of claim 4, wherein the sheet metal is formed of aluminum.

6. The axle assembly of claim 1, wherein a projection is formed on the body and the opening is defined by an inward side of the projection.

7. The axle assembly of claim 6, wherein the tab covers a majority of the opening.

8. An axle assembly comprising:
   an axle housing defining a cavity and an access aperture;
   a differential assembly received in the cavity, the differential assembly supported for rotation in the axle housing;
   a cover with a flange and a body, the flange coupled to the axle housing such that the cover closes the access aperture, the body having an opening that is in fluid connection with the cavity;
   a vent mounted to the body and in fluid communication with the opening, the vent providing fluid communication through the cover to the atmosphere;
   a means for sealing the axle assembly and for shielding the opening and the vent from splash lubrication during operation of the axle assembly.

9. An axle assembly comprising:
   an axle housing defining a cavity and an access aperture;
   a differential assembly received in the cavity, the differential assembly supported for rotation in the axle housing;
   a cover with a flange and a body, the flange coupled to the axle housing such that the cover closes the access aperture, the body having an opening that is in fluid connection with the cavity, wherein a projection is formed on the body and the opening is defined by an inward side of the projection;
   a vent valve mounted to the body and in fluid communication with the opening;
   a gasket having a gasket member and a tab, the gasket member being disposed between the axle housing and the flange, the tab extending inwardly from the gasket member and covering majority of the opening, the tab being adapted to shield the opening and the vent valve from splash lubrication during operation of the axle assembly.

* * * * *